HERBERT R. SAFFELL
DOUGLAS HOPE
INVENTORS.

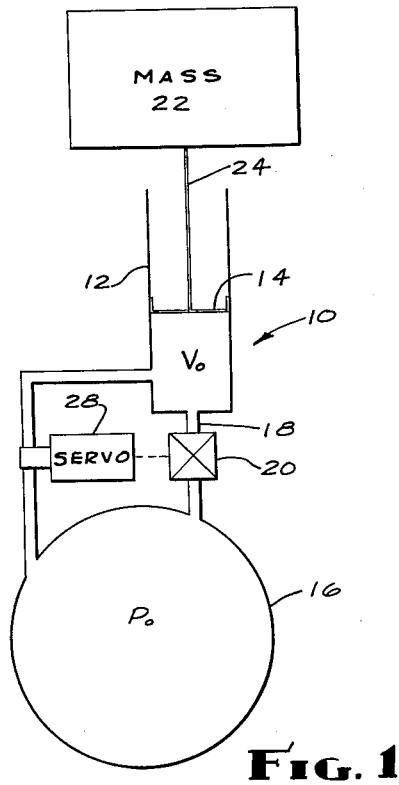
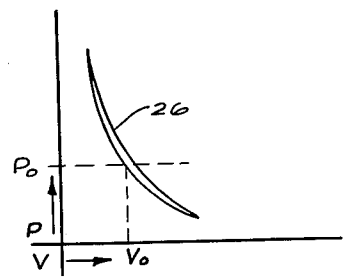
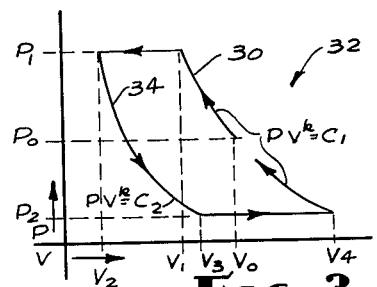
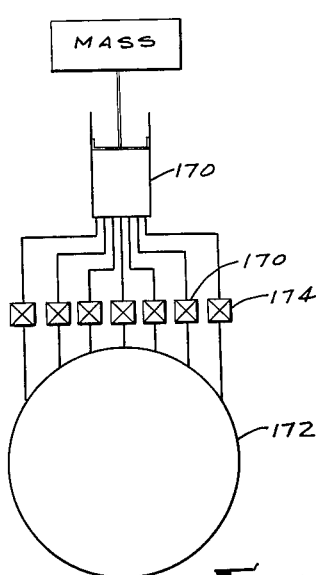
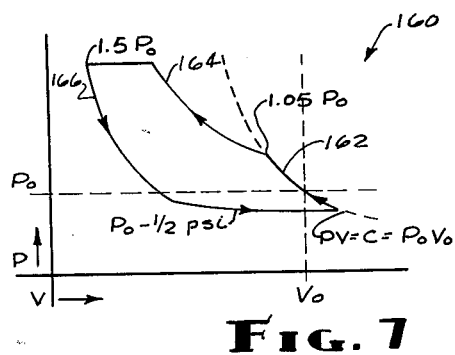
Fig. 1
Fig. 2
Fig. 3
Fig. 7
Fig. 8
HERBERT R. SAFFELL
DOUGLAS HOPE
INVENTORS.

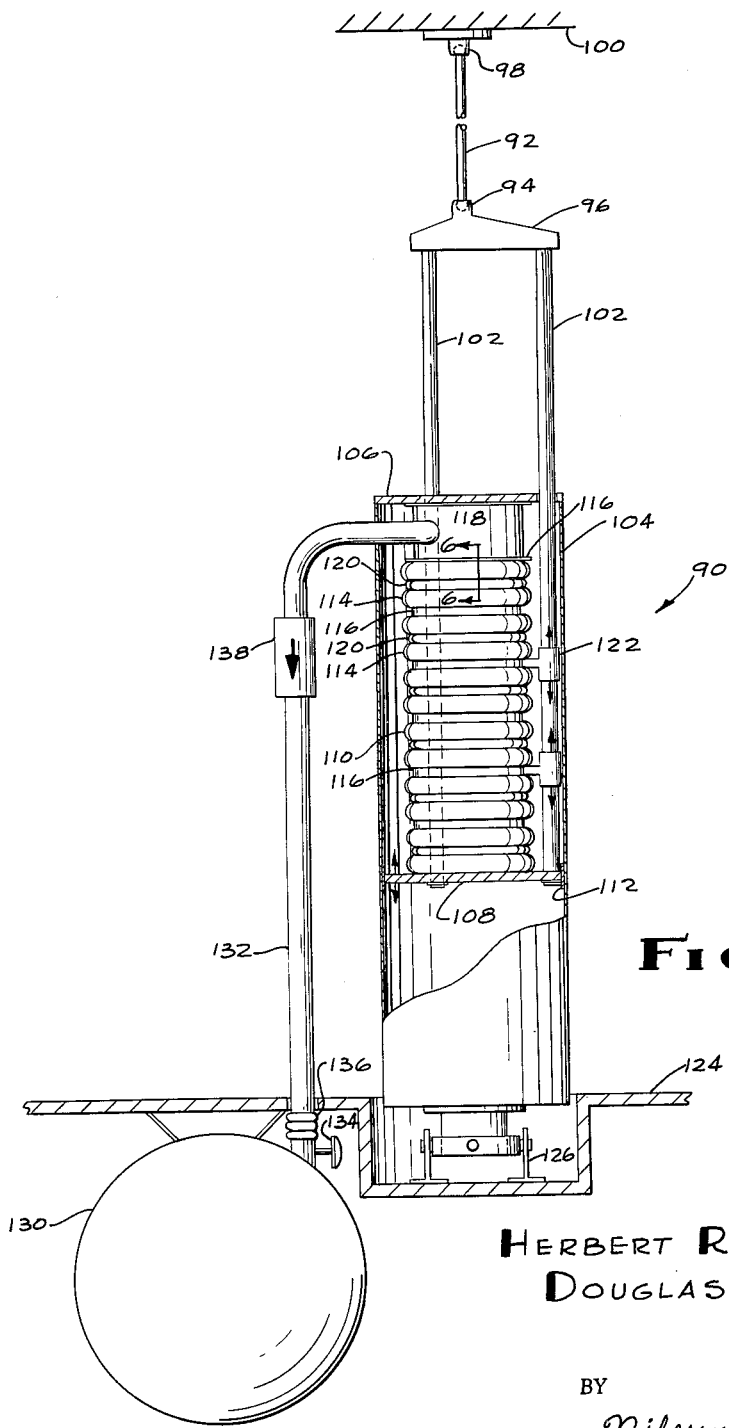

United States Patent Office 3,233,886
Patented Feb. 8, 1966

3,233,886
PNEUMATIC SHOCK ISOLATOR AND METHOD
Herbert R. Saffell, El Segundo, and Douglas Hope,
Seal Beach, Calif.
Filed Apr. 9, 1963, Ser. No. 271,675
4 Claims. (Cl. 267—1)

This invention relates generally to shock energy absorption and more particularly to a system and method for isolating a body from its structural environment and for dissipating shock energy transmitted through the suspending members.

In the field of modern suspension systems it is often imperative that a massive platform or enclosure be effectively isolated from its surroundings with respect to shock impulses, or vibration transients in general. Typical examples include equipment and instrument platforms in buildings, aboard ships, submarines, aircraft, and ground vehicles.

Another example, and one with respect to which the problem is particularly stringent and difficult to solve because of the energies involved, is modern bomb-proof housings for vital, shock vulnerable, weapons control systems which are frequently placed underground to avoid atmospheric blast effects and other damaging factors to which an above-ground environment is exposed. A suspended platform is required for isolating the equipment from the surrounding soil and rock because of seismic shocks due to proximate explosions or earth fault movements.

To this end, such housings typically have, in accordance with the prior art, been spring suspended as by coil springs, or other elastically deformable solid materials, or pneumatic or hydraulic spring systems.

To provide spring suspension even for massive platforms or enclosures is a relatively elementary problem; however, it is will known that merely to spring suspend a body frequently gives rise to more, and non-elementary, problems than it solves, because the springs, irrespective of their type, cause the supported system to have a natural frequency of oscillation with respect to the environment. Depending upon the nature of the particular driving shock forces, the suspended system may be driven to oscillate with a destructive amplitude so as to defeat the initial object of the isolation system.

Accordingly, it is mandatory, for shock isolation without undue oscillation, that the energy from the shock impulse, which is otherwise stored in the spring system, be absorbed and dissipated without causing the springs to become effectively overly stiff and thereby defeated.

A typical disadvantage of prior art systems is that the damping effects are critically dependent upon the amount of mass to be suspended, so that the loading of platform cannot be freely altered without consideration of adjustment to the suspension system.

The better of the known prior art attempts have in large measure solved the above noted and other deficiencies, but have done so at the expense of providing complex systems requiring active pneumatic pumps or expendable compressed gas reservoirs and power supplies for energizing electrical or electronic and pneumatic or hydraulic control loops. As a result, such systems are extremely costly and their overall reliability is disadvantageously low unless the system is made even more costly and complex by building-in a considerable amount of redundancy. In addition an inherent disadvantage of such complex systems is that in order for the components of the suspension and damping system to themselves be protected from the shock impulses, they must be carried on the isolated platform thereby increasing the amount of mass to be isolatingly supported and aggravating the overall problem.

It is therefore an object of the present invention to provide a system and method of pneumatically shock isolating a relatively massive housing which are not subject to the above noted and other disadvantages and deficiencies of the prior art.

It is another object to provide such a system which is pneumatically permanently sealed-off and which is thereby a pneumatically closed system.

It is another object to provide such a system which is relatively inexpensive and mechanically simple, rugged, and reliable.

Briefly these and other objects and advantages are achieved in accordance with one aspect of the invention in which an equipment platform is supported on compressed air springs having the form of longitudinally flexible, internally pressurized bellows.

The bellows communicate pneumatically with a compressed air reservoir, the volume of which is large compared to that of the bellows, whereby the reservoir pressure is substantially constant and independent of the bellows displacement. The communication is such that when a shock impulse causes the bellows air spring longitudinally to expand or contract, air may be withdrawn or returned, respectively, to the reservoir. If the flow into and out of the pressurized reservoir were unobstructed, the suspended platform would be free to oscillate substantially adiabatically, i.e., without significant damping except for friction effects. However, in accordance with this example of the invention, a pair of check and relief valves are interposed in parallel between the bellows and the reservoir in a manner to control the effective stiffness and damping of the spring system in response to the motion and instantaneous volume displacement of the bellows. In general terms, the stiffness is caused to be relatively small, or weak, when the bellows volume is increasing; and is caused to be stronger, for the most part, when the volume is decreasing.

The control in this example is provided by one of the valves opening for flow toward the reservoir as the pressure in the bellows increases above the reservoir pressure; and by the other valve opening for flow into the bellows as the pressure in the latter goes below that of the reservoir. By reference to thermodynamic pressure-volume considerations, it is apparent that the process is no longer reversible or adiabatic, but can be made to be highly hysteretic whereby the impulse energy causing volume displacement in the bellows is transferred thermodynamically to the gas reservoir from whence it may be dissipated over an extended period of time as a heat transfer from the gas.

Further details of these and other novel features and other examples as well as additional objects and advantages of the invention will become apparent and be best understood from a consideration of the following description taken in connection with the accompanying drawings which are presented by way of illustrative example only and in which:

FIG. 1 is a schematic diagram for illustrating the principles of operation of the invention;

FIG. 2 is a pressure-volume graph plotting the nearly adiabatically changing pressure in a cylinder as a function of its volume change due to a moving piston therein;

FIG. 3 is a pressure-volume diagram illustrating the non-adiabatic operation of the system shown schematically in FIG. 1;

FIG. 5 is a partially sectioned view of an example of a compressed gas spring;

FIG. 7 is a pressure-volume diagram illustrating the operation of the structure of FIG. 5; and FIG. 8 is a schematic view of an alternative example of a gas spring suspension system constructed in accordance with the principles of the present invention.

Figure 4:
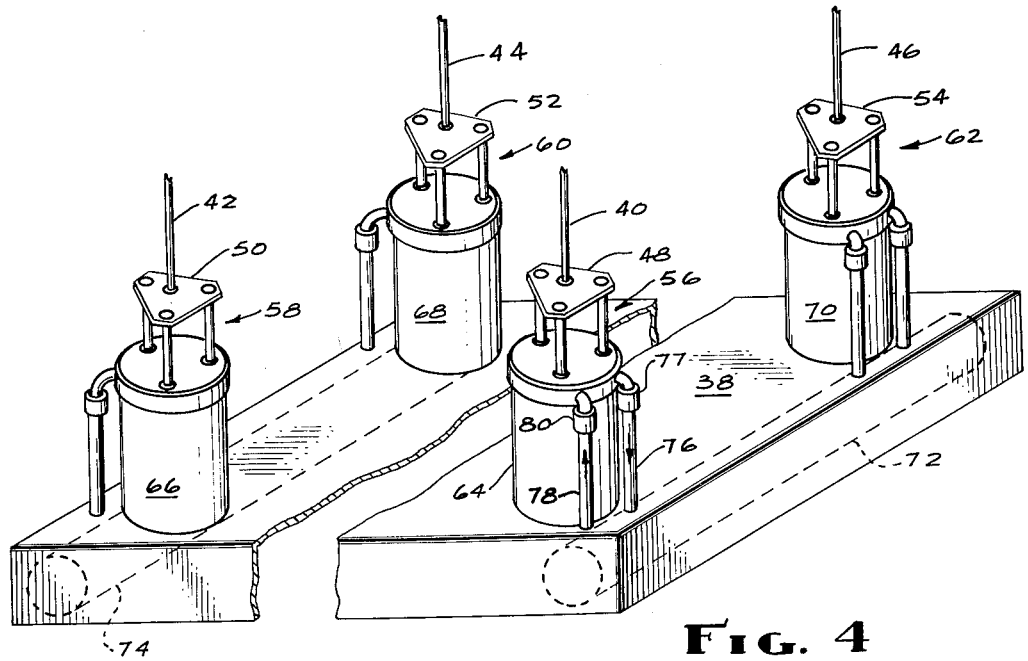
FIG. 4 is a perspective view of a shock isolated platform utilizing a plurality of compressed gas springs and constructed in accordance with the principles of the present invention.

Referring to the figures in more detail, it is stressed that the particulars shown are by way of example only and are presented in the cause of providing what is believed to be the most useful and readily understood description of the method, principles, and structural concepts of the invention. The detailed showing is not to be taken as a limitation upon the scope of the invention which is defined by the appended claims forming, along with the drawing, a part of this specification.

In FIGURE 1 an example of the invention, illustrated schematically, is shown to include a vertically oriented pneumatic spring 10 which includes a cylinder 12 and a compressing piston 14. The portion of the cylinder 12 which is closed by the piston 14 is coupled to a large pressure reservoir 16 through a conduit 18. A valve 20 is interposed in the conduit 18 to control gas flow between the pneumatic spring 10 and the reservoir 16.

A body to be isolated with respect to the remainder of the system shown is represented as a mass 22 which vertically loads the piston 14 through a compression supporting shaft 24. A static pressure of $P_0$ in the reservoir is selected and provided such that the mass 22 is statically supported against gravity with a volume $V_0$ of the compressed gas in the cylinder 12 below the piston 14.

If the valve 20 is closed and a vertical upward impulse is applied to the cylinder 12, the mass 22, as thus far described, will oscillate at the natural frequency of the system with the piston 14 moving up and down in the cylinder. The resulting pressure-volume cycling is illustrated by the curve 26 of the graph of FIG. 2. As may be seen by the substantially closed, or zero area loop outlined by the curve 26, the cycling may be substantially adiabatic, the hysteretical variation therefrom being caused by the non-ideal nature of the gas and by frictional effects.

The initial energy of the gas is proportional to $P_0V_0$, where $P_0$ is the original static pressure and $V_0$ is the initial volume of the gas in the pneumatic spring 10. The energy after the cycle shown by the closed loop of the curve 26 is slightly greater, and in a practical case would be manifest as a slightly greater volume, due to the increased temperature of the gas representing some absorption of the energy of the impulse imparted to the mass 22. The very slight hysteresis area of the loop of the curve 26 indicates that very little damping of the oscillating system can be achieved in the manner thus far described.

In the graph of FIG. 3, the highly non-adiabatic, hysteretical operation of the system of FIG. 1 is shown when the valve 20 is selectively opened and closed by a differential pressure detecting servo 28 to change, twice in each cycle of the oscillating gas, the effective stiffness and, therefore, the instantaneous natural frequency of the pneumatic spring.

In a cycle of the operation of this example of the invention, as the volume of the pneumatic spring 10 is decreased from $V_0$, as shown by the portion 30 of the curve 32 of FIG. 3, the valve 20 remains closed and the pressure in the pneumatic spring 10 is increased substantially adiabatically along the curve $PV^k = C_1$, a constant.

When the volume reaches $V_1$, the corresponding pressure $P_1 = C_1/V_1^k$ causes the valve 20 to be opened and gas flows out of the pneumatic spring 10 at constant pressure until the piston 14 reaches the bottom of its swing at $V_2$. At that time, the piston begins an expansion stroke and the reduced pressure causes the valve 20 to be closed; consequently the expansion is substantially adiabatic along the portion 34 of the curve 32 whereon $PV^k = C_2$.

When the increased volume reaches $V_3$, the corresponding reduced pressure $P_2$ causes the valve 20 to be opened again and the expansion continues at constant pressure until the piston 14 reaches the top of its stroke at $V_4$. At this point, a compression stroke begins, the pressure rises, and the valve 20 is caused to close so that the compression is again substantially adiabatic.

The hysteresis of the cycle is readily apparent; and its magnitude is of course measured by the area, in appropriate units, within the curve 32; the work or energy thereby represented being a measure per cycle of that coupled from the oscillating system to the reservoir 16 where it becomes manifest as a slight temperature increase. The extra heat in the reservoir is, in a period of time, short with respect to the period between expected shock impulses, radiated and conducted away to the surrounding environment. Thusly the oscillation caused, by the mass and restoring forces in the suspension system, and set in motion by the shock impulse, is very quickly damped and its energy dissipated from the pneumatic spring system.

Referring to FIG. 4, an example of the invention is illustrated in which a relatively massive platform 38 is isolatingly suspended from an overhead structure, not shown, by four tension supporting rods 40, 42, 44, 46, which are each connected to a respective spreader plate 48, 50, 52, 54, by a ball and socket swivel joint as shown. Each of the spreader plates is, in turn, connected to a respective set 56, 58, 60, 62 of tension supporting rods which enter the pneumatic spring housings 64, 66, 68, 70 and couple to one end of the pneumatic spring housed in each. The other end of each spring is coupled to the platform 38.

Each of the pneumatic springs is coupled to a large pressurized reservoir 72 or 74, supported on the platform 38. The volume of each of the reservoirs is of the order of ten times that of the springs to which it is connected. The coupling is achieved in each case, in this example of the invention, by a pair of conduits 76, 78.

Interposed in the conduit 76 is a relief valve 77 which, in this example, cracks when the pressure in the spring is 105% that of the reservoir and opens for full flow when the spring pressure is 150% that of the reservoir. Consequently when the instantaneous pressure within the spring reaches the 150% level, its volume is further decreased at that constant pressure.

Interposed in the conduit 78 is, in this example, a check valve 88 which opens for full flow in the reverse direction, i.e., into the spring when its pressure drops to ½ pound per square inch below the pressure in the reservoir.

Referring to FIG. 5 an example of a pneumatic spring 90 is shown in more detail. The present example may be taken as a structural description of the pneumatic spring 10 shown schematically in FIG. 1 or the pneumatic spring enclosed within the housing 64 of FIG. 4. As in the structure of FIG. 4 a tension supporting rod 92 which may be rigid and capable of supporting compression therein is connected by a ball joint 94 to a spreader plate member 96. A similar ball joint 98 may be utilized at the top of the rod 92 for connecting the rod to the overhead structure 100 of the supporting environment which in the case of an underground platform to be shock-isolated from the seismic waves may be the ceiling of the underground enclosure or excavation.

Suspended below the spreader plate 96 a plurality of tension supporting rigid rods 102 which enter a housing 104 for the pneumatic spring 90 through a bellows capping member 106. The rods 102 are terminated at a bellows base support plate 108 to which they are supportingly connected as by matching threads on the rod and in the plate 108. A longitudinally flexible bellows 110 is supported compressively between the plate 108 and the capping member 106; and the plate 108 permits longitudinal flexing of the bellows by sliding up or down within the cylindrical walls of the housing 104. To this end a self-lubricating Teflon collar 112 may be affixed about the periphery of the plate 108, to assure vertical motion of the plate without undue lateral oscillations.

Figure 6:
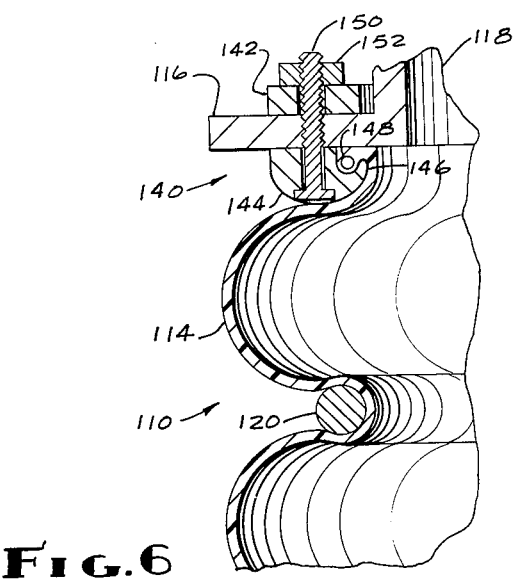
FIG. 6 is an enlarged sectional view of a portion of the structure of FIG. 5 taken along the lines 6—6 thereof.

The bellows 110 in this example is formed of a plurality of cylindrical sections 114 which are each joined to an adjacent one by means of a clamping collar 116 or in the case of the upper and lower end sections, they are clamped peripherally to the bellows base plate supporting member 108 and respectively to the lower collar 116 of a rigid ferrule 118, as will be shown in more detail in connection with FIG. 6. Circumposed about the mid portion of the sections 114 is a rigid toroidal girdle hoop 120. Further details of the girdle hoops 120 and the bellows sections 114 are also shown in the subsequent figure.

Affixed to and extending radially outwardly from one or more of the clamping collars 116 are hollow cylindrical guide members 122 which add radial and angular stability to the flexible bellows 110 as it is flexed longitudinally up and down.

The bellows capping member 106 is affixed rigidly to the upper end of the housing 104 while the lower end of the latter is secured in a tension supporting relationship to the platform 124 to be isolatingly suspended from the overhead structure 100. A gimbal structure 126 is utilized for interconnecting the housing 104 to the platform 124.

A pressure reservoir 130, the volume of which is at least as large as that of the bellows 110, is rigidly supported by the platform 124 as shown. A pressure conduit 132 is connected through a shutoff valve 134 and a flexible joint 136 to the interior of the ferrule 118 which communicates and is part of the internal volume of the bellows 110. As indicated in FIG. 4 there are in this example two such conduits 132, only one of which is shown in this view of the structure. In the conduit 132 a relief valve 138 is interposed while in the associated conduit, not shown, there is disposed a check valve for controlled flow in the opposite direction, the relief valve shown permitting or being adapted to permit the flow of gas out of the bellows when its pressure is greater by a predetermined degree than that in the pressure reservoir 130. The relief valve 138 selected for utilization in a constructed example of the invention was adapted to "crack" at a pressure in the bellows of 105% and that of the pressure in the reservoir 130 and to open for full flow at substantially constant pressure when the bellows pressure reached 150% of the reservoir pressure. The associated check valve, not shown, was selected in the particular constructed example to permit flow in the reverse direction when the bellows pressure became less by one half pound per square inch than that in the pressure reservoir 130.

Referring to FIG. 6 in more detail a view of the portion of the structure of FIG. 5 is shown taken along the lines 6—6 thereof near the top of the figure. In this view the rigid bellows 118 with its lower flange 116 is illustrated in its pneumatically sealed juncture with the upper section 114 of the bellows 110. A circular collar clamp 140 includes a backing ring 142 and a clamping collar 144 with a circular lip portion 146 which compressively holds a corresponding peripheral lip portion 148 of the top of the bellows section 114, against the flange 116 of the ferrule 118. A series of tension supporting bolts 150 with associated nuts 152 may be utilized to clamp the upper periphery of the bellows section 114 in the manner indicated.

As indicated earlier the material of the flexible bellows section may be of a plastic substance such as nylon; however, for particularly high or low temperature applications, or for greater flexibility and strength, as well as less diffusion of the heat, the bellows may be made of a metal such as beryllium copper or stainless steel. In either event the particular details of construction including the utilization or deletion of the girdle hoops 120 may be varied in accordance with the judgment of the skilled artisan.

Referring to FIG. 7 the operation of the pneumatic spring 90 of FIG. 5 is illustrated. Assuming that the initial volume of the bellows is $V_0$ and that its pressure is $P_0$ equal to that of the pressure reservoir 130, the energy of the compressed gas within the valves is represented by the point $P_0$, $V_0$, on the curve 160 of the graph of FIG. 7. Assuming then that a vertically upwardly directed impulse is imparted to the overhead structure 100, the bellows base plate 108 will be raised with respect to the housing 104 and the bellows will be compressed along a substantially adiabatic portion 162 of the curve 160. When, however, the compression causes the pressure to reach 105% of $P_0$, the relief valve 138 begins to open so that the rate of increased pressure with lowering volume of the bellows has a lesser slope as shown by the portion 164 of the curve. Then when the pressure within the bellows reaches 150% of $P_0$ the valve 138 opens full and permits the volume to decrease further without increase in pressure until the base plate member 108, supporting the bellows, is displaced to its highest level, that is the top of its swing, at which point it begins its downward swing, the valve 138 closes, and an adiabatic expansion begins as represented by the curve portion 166. The substantially adiabatic expansion continues until the pressure within the bellows becomes slightly less, e.g. one half pound per square inch, than $P_0$, the pressure in the reservoir 130, at which point the check valve, not shown, opens for full flow and permits further downward displacement of the bottom of the bellows beyond the original $V_0$ displacement with little increase in pressure because of the compressed gas supplied through the check valve from the reservoir 130. When the bellows reaches the bottom of its downward swing, the check valve closes and an adiabatic compression begins again similar to that indicated by the portion 164 of the curve 160.

In actuality the shape of the hysteretical curve 160 is somewhat smoother than that indicated in FIG. 7. However, as indicated, the area within the curve is significant and represents the magnitude of energy per cycle which is thermodynamically coupled from the flexing bellows, the oscillating system, to the gas in the pressure cylinder 130. In addition to the area abounded by the curve 160 it is to be noted that the stiffness of the pneumatic spring is maximized in general when the volume displacement is at a maximum variation from $V_0$ and is returning theretoward; and that the stiffness is minimized, thereby increasing the isolation, when the displacement is moving away from the static condition of $V_0$. This effect is more apparent from the graph of FIG. 7 when it is considered that during the repetitive cyclical operation the closed curve 160 would tend to be more evenly centered about the position $P_0$, $V_0$.

Referring to FIG. 8 a further example of the invention is illustrated in accordance with which an arbitrarily shaped non-adiabatic hysteretical curve may be obtained by the use of a plurality of check and relief valves. In this example the pneumatic spring 170 is pneumatically coupled to a pressure reservoir 172 through a number of conduits in each of which is interposed either a check valve 174 or a relief valve 176, each of which may have somewhat different characteristics as selected to suit the needs and purposes of the artisan. Alternatively the valves may be servo-controlled as indicated in the example of the invention in FIG. 1, and the servo may include electronic and electrical components as well as hydrodynamic or pneumatic sensors and actuating elements.

There has thus been described a number of examples of the method and system of shock isolating a platform or enclosure which examples achieve the objects and exhibit the advantages discussed earlier above.

What is claimed is:

1. A system for isolating a body from shock impulses transmitted through its supporting environment comprising: a pneumatic spring connected between the supporting environment and the body to be isolated and compressed, by supporting the mass of said body, to a static gas volume and pressure; a gas reservoir having a fixed volume at least as large as that of said pneumatic spring and pressurized to said static pressure; controllable flow means coupled between said pneumatic spring and said gas reservoir; control means coupled to said controllable flow means; pressure sensing means coupled to said control means, said spring, and said reservoir sensitive to pressure differentials between said pneumatic spring and said reservoir to cause said control means to control, in quantity and direction, gas flow from said pneumatic spring to said reservoir when the instantaneous pressure in said pneumatic spring is greater than said predetermined pressure by a predetermined degree and for permitting gas flow from said reservoir to said pneumatic spring when the instantaneous pressure therein is less by a predetermined degree than said predetermined pressure, whereby the pressure and volume of said compressed gas in said pneumatic spring may be hysteretically cycled to couple the energy of said transmitted shock impulses thermodynamically to the gas in said reservoir.

2. A system for isolating a body with respect to seismic shock waves transmitted through the supporting environment, the system comprising: a bellows base support; first tension supporting means affixed to said base support member; connecting means for connecting said tension supporting means to the supporting environment; a bellows, flexible in the direction of the indicated tension and bellows base support member, the internal volume of said bellows varying in accordance with its longitudinal flexing; second tension supporting means connected between said bellows and the body, said bellows member being thereby held in compression by said second tension supporting means and said bellows base support member; a compressed gas reservoir disposed on said body, having a volume at least as large as that of said bellows, and being pressurized to a predetermined pressure, said pressure being of a magnitude when communicated to the interior of said bellows to cause the latter to support said body in a pneumatic spring relation; gas flow conduit means connected between said bellows and said reservoir for providing such communication; first valve means interposed in said conduit means sensitive to the pressure differential between said bellows and said reservoir and being of the character to permit a varying magnitude of gas flow from said bellows to said reservoir as a function of said pressure differential when the pressure in said bellows is greater than said predetermined pressure; and second valve means interposed in said conduit means sensitive also to said pressure differential and being of the character to permit gas flow in the opposite direction when the pressure in said bellows is less than said predetermined pressure, the compressed, supporting gas in said bellows being thereby cycled hysteretically to couple shock impulse energy from said tension supporting members thermodynamically to said reservoir from whence it may be dissipated as heat.

3. A system for isolating a body with respect to seismic shock waves comprising a plurality of automatically damping pneumatic supporting springs each of which includes: a bellows base support; first tension supporting means affixed to said base support member; connecting means for connecting said tension supporting means to the supporting environment; a bellows, flexible in the direction of the indicated tension and bellows base support member, the internal volume of said bellows varying in accordance with its longitudinal flexing; second tension supporting means connected between said bellows and the body, said bellows member being thereby held in compression by said second tension supporting means and said bellows base support member; a compressed gas reservoir disposed on said body, having a volume at least as large as that of said bellows, and being pressurized to a predetermined pressure, said pressure being of a magnitude when communicated to the interior of said bellows to cause the latter to support said body in a pneumatic spring relation; gas flow conduit means connected between said bellows and said reservoir for providing such communication; first valve means interposed in said conduit means sensitive to the pressure differential between said bellows and said reservoir and being of the character to permit a varying magnitude of gas flow from said bellows to said reservoir as a function of said pressure differential when the pressure in said bellows is greater than said predetermined pressure; and second valve means interposed in said conduit means sensitive also to said pressure differential and being of the character to permit gas flow in the opposite direction when the pressure in said bellows is less than said predetermined pressure, the compressed, supporting gas in said bellows being thereby cycled hysteretically to couple shock impulse energy from said tension supporting members thermodynamically to said reservoir from whence it may be dissipated as heat.

4. A system for isolating a body with respect to seismic shock waves transmitted through the supporting environment, the system comprising: a bellows base support member; a plurality of parallel tension supporting members affixed to said base support member; tension supporting connecting means for connecting said tension supporting members to the supporting environment; a bellows longitudinally flexible in the direction of said tension and having a volume which varies in accordance with the longitudinal flexing and being disposed on said bellows base support member; a rigid bellows capping member disposed over said bellows; a tension supporting gimbal member affixed to said body; a tension supporting and bellows guiding member connected between said bellows capping member and said gimbal member, said bellows member being thereby held in compression between said bellows capping member and said bellows base support member; a compressed gas reservoir disposed on said body pressurized to a predetermined pressure, said pressure being of a magnitude when communicated to the interior of said bellows to cause the latter to support said body in a pneumatic spring relation; gas flow conduit means connected between said bellows and said reservoir for providing such communication; relief valve means interposed in said conduit means sensitive to the pressure differential between said bellows and said reservoir and being of the character to permit a varying magnitude of gas flow from said bellows to said reservoir as a function of said pressure differential when the pressure in said bellows is greater than said predetermined pressure; and check valve means interposed in said conduit means sensitive also to said pressure differential and being of the character to permit gas flow in the opposite direction when the pressure in said bellows is less than said predetermined pressure, the compressed, supporting gas in said bellows being thereby cycled hysteretically to couple shock impulse energy from said tension supporting members thermodynamically to said reservoir from whence it may be dissipated as heat.

References Cited by the Examiner

UNITED STATES PATENTS

| | | | |
|---|---|---|---|
| 2,773,686 | 12/1956 | Nash | 267—65 |
| 2,842,359 | 7/1958 | Auer | 267—65 |
| 2,937,865 | 5/1960 | Patterson | 267—65 X |
| 2,999,680 | 9/1961 | Eiseman | 267—64 |

CLAUDE A. LE ROY, *Primary Examiner.*